Jan. 17, 1967  E. Y. MANN  3,298,650
SUPPORT FOR CONTAINERS
Filed March 2, 1966
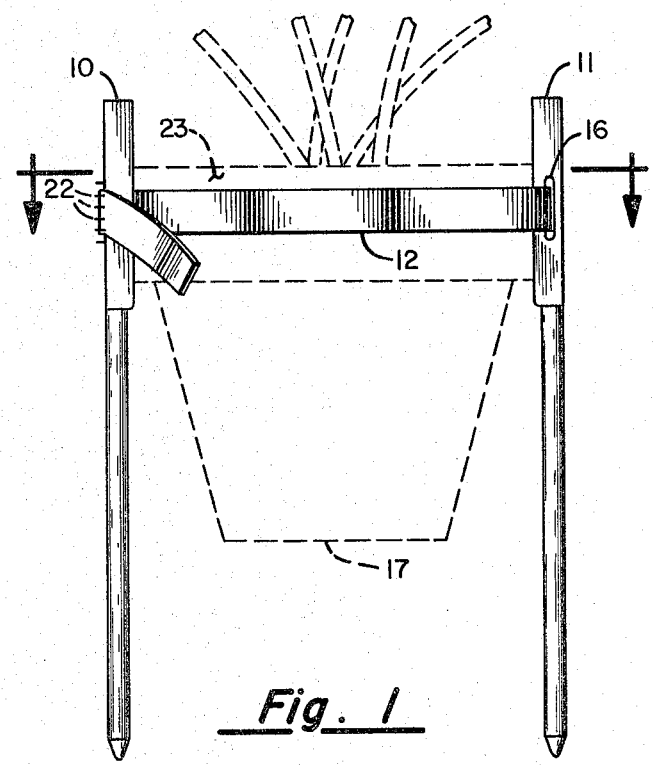
Fig. 1
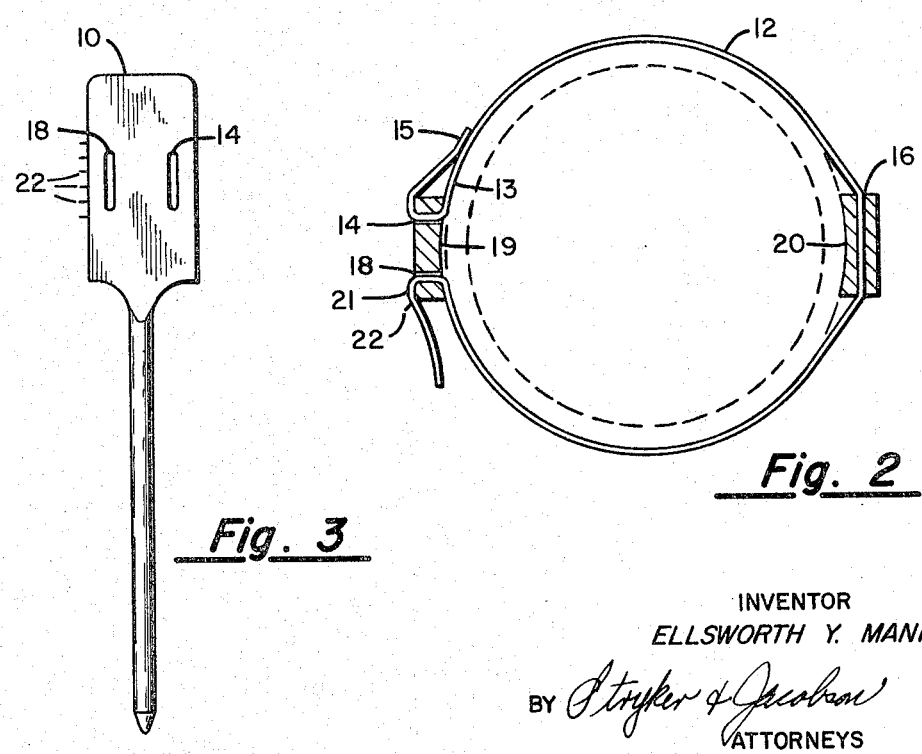
Fig. 3
Fig. 2
INVENTOR
ELLSWORTH Y. MANN
BY Stryker & Jacobson
ATTORNEYS

3,298,650
SUPPORT FOR CONTAINERS
Ellsworth Y. Mann, 5 Cypress Road,
St. Paul, Minn. 92024
Filed Mar. 2, 1966, Ser. No. 531,152
6 Claims. (Cl. 248—154)

This invention is directed toward providing an inexpensive, easy-to-use, temporary support for containers, such as flower pots and the like. The support provided keeps the container from being tipped over from the wind or if brushed against. Typically, the invention can be used to provide support for plants in a flower pot which is set on the ground in a yard or cemetery or the like, or when the pot is set down temporarily while preparations are made to transplant the plants in the ground.

These and other features and advantages of this invention will become apparent during the course of the following detailed description in which:

FIG. 1 is a front view of a preferred embodiment of the invention as it is used in conjunction with a flower pot;

FIG. 2 is a view taken along the section line 2—2 of FIG. 1 showing in greater detail the construction of the preferred embodiment of FIG. 1; and FIG. 3 is a view showing some of the detailed construction of one of the support pegs that is used in the preferred embodiment shown in FIGS. 1 and 2.

Referring now to the figures, a pair of wooden or plastic pegs 10 and 11 have their lower ends narrowed and tapered so they can be easily inserted into the ground. A belt or strip 12 of flexible material, which may be some inexpensive fabric or plastic, is attached at one end 13 to peg 10. The strip 12 can be attached to the peg in any convenient manner, such as by tacking it directly to the peg or, as illustrated at 15 in FIG. 2, looped through slot 14 which is near one side of peg 10 back on itself where it is stapled or sewn or otherwise joined together. The strip 12 then passes through a slot 16 which is formed in the other peg 11 and returns to the first peg 10 while it encricles the container 17 which is shown in shadow line. The free end of the strip 12 is slipped through a slot 18 in the peg 10 which is located near the other side of the peg, and is pulled taut until the two pegs 10 and 11 press tightly against the cylinder portion 23 of the outside wall of container 17. While the strip is being tightened, if necessary the peg 11 may be slipped along the strip 12 until it is opposite peg 10 so as to provide the best support for the container therebetween. Preferably, the part of the inner facing surfaces 19 and 20 respectively of pegs 10 and 11 which come into contact with the cylindrical part of the wall of the container 17 should be shaped to the same contour as that part of the container wall. As observed in FIG. 2 which illustrates a flower pot being supported between the pegs, the inner facing surfaces 19 and 20 of the pegs 10 and 11 are somewhat concave to press more fully against the wall portion 23.

When the strip 12 is suitably tightened, the free end is looped back, as observed most clearly in FIG. 2 at 21, and the strip 12 is pressed against the relatively sharp teeth or pins 22 which jut out from an edge of the peg 10. These teeth hold the strip 12 in the taut condition while it is encircling the container and while the pegs 10 and 11 are resting snugly and tightly against the container. The pegs, with the container held therebetween, are then inserted in the ground to provide support against the container tipping over. The bottom end of the pegs 10 and 11 ordinarily extend below the bottom of the container but usually are inserted into the ground a sufficient amount so that the bottom of the container rests on the ground. In this way the weight of the container does not have to be supported by the pegs or the strip. It is contemplated, however, that in some instances the pegs may be constructed somewhat shorter and with their bottom ends widening out. The bottom ends would then be level with the bottom of the container and would not be inserted in the ground but would merely rest on the ground in line with the bottom of the container and thereby provide the support to keep the container from tipping over.

The relative ease with which the parts of the support can be manufactured and assembled, the adaptability of relatively inexpensive materials for making the various parts and the ease with which the support can be attached to and released from a container illustrate the advantages and the features of the invention to provide the sought for temporary support.

I claim:

1. A support for a container comprising: a pair of pegs; a strip of flexible material fixedly attached at one end to one of the pegs, slidably linked with means on the other peg, and releasably attached at its other end to said one peg; the arrangement being such that the other peg is movable along the strip to be positioned opposite said one peg with a container therebetween while the strip is tightened to snugly encircle and hold the container.

2. The invention as described in claim 1 wherein the means by which said strip is linked with said other peg is a slot.

3. The invention as described in claim 2 wherein the strip is attached at its other end to said one peg by passing through a slot formed in said one peg and being engaged with means on said one peg for releasably holding said strip, whereby the strip is pulled through the slot in the one peg until taut and is then held taut by said holding means.

4. The invention as described in claim 3 wherein said holding means comprises teeth extending outward from said one peg for piercing the strip.

5. The invention as described in claim 4 wherein both pegs are in part shaped to the contour of the outer wall of a container with which they abut such that they are brought into pressing surface contact with the outer wall of the container when the strip is pulled taut.

6. The invention as described in claim 4 wherein the lower part of the pegs have substantial length so that they may be inserted into the ground and thus be below the bottom of a container mountable in the support.

No references cited

CLAUDE A. LE ROY, *Primary Examiner.*